(12) United States Patent
Ko et al.

(10) Patent No.: US 9,160,426 B2
(45) Date of Patent: Oct. 13, 2015

(54) COOPERATIVE COMMUNICATION METHOD IN CELLULAR WIRELESS COMMUNICATION SYSTEM AND TERMINAL FOR PERFORMING THE METHOD

(75) Inventors: Young-Jo Ko, Daejeon (KR); Jae Young Ahn, Daejeon (KR); Bangwon Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 451 days.

(21) Appl. No.: 13/260,874

(22) PCT Filed: Apr. 22, 2010

(86) PCT No.: PCT/KR2010/002528
§ 371 (c)(1),
(2), (4) Date: Sep. 28, 2011

(87) PCT Pub. No.: WO2010/123295
PCT Pub. Date: Oct. 28, 2010

(65) Prior Publication Data
US 2012/0046033 A1    Feb. 23, 2012

(30) Foreign Application Priority Data
Apr. 24, 2009 (KR) .................. 10-2009-0035844

(51) Int. Cl.
*H04W 4/00* (2009.01)
*H04B 7/02* (2006.01)
(Continued)

(52) U.S. Cl.
CPC .............. *H04B 7/024* (2013.01); *H04L 5/0035* (2013.01); *H04B 7/0417* (2013.01); *H04B 7/0626* (2013.01)

(58) Field of Classification Search
CPC .. H04W 72/04; H04W 72/0413; H04B 7/024; H04B 7/0626; H04L 27/2626
USPC .......... 455/69, 450, 452.1, 452.2, 453, 67.11, 455/63.1, 67.13; 370/328–329, 203, 464, 370/236, 249; 375/267, 260
See application file for complete search history.

(56) References Cited

U.S. PATENT DOCUMENTS 6,480,558 B1 * 11/2002 Ottosson et al. ............... 375/350
6,894,995 B2 * 5/2005 Chitrapu et al. ............... 370/335
(Continued)

FOREIGN PATENT DOCUMENTS

| KR | 1020050081528 | 8/2005 |
| KR | 1020070073508 | 7/2007 |
| KR | 1020080099703 | 11/2008 |

OTHER PUBLICATIONS

3GPP TS 36.214 V10.1.0, "3rd Generation Partnership Project; Technical Specification Group Radio Access Network; Evolved Universal Terrestrial Radio Access (E-UTRA); Physical Layer; Measurements (Release 10)," Lte Advanced (2011).

(Continued)

*Primary Examiner* — Marceau Milord
(74) *Attorney, Agent, or Firm* — Nelson Mullins Riley & Scarborough LLP

(57) ABSTRACT

Provided is a coordinated communication method in which a plurality of cells cooperate to perform multi-antenna transmission and reception in a cellular wireless communication system. A terminal wirelessly transmits channel state information (CSI) feedback to a serving cell and at least one coordinating cell. The serving cell and the coordinating cell perform multi-point coordinated communication using the CSI feedback. Even if the serving cell and the coordinating cell belong to different base stations, information exchange between the cells is minimized, so that a transmission delay and a traffic increment of a backhaul network can be prevented.

11 Claims, 6 Drawing Sheets

(51) Int. Cl.
*H04L 5/00* (2006.01)
*H04B 7/04* (2006.01)
*H04B 7/06* (2006.01)

(56) References Cited

U.S. PATENT DOCUMENTS

| | | | | |
|---|---|---|---|---|
| 7,110,782 B2* | 9/2006 | Yamaguchi | | 455/502 |
| 7,289,483 B1* | 10/2007 | Lim | | 370/342 |
| 7,386,055 B2* | 6/2008 | Morita et al. | | 375/260 |
| 7,428,268 B2* | 9/2008 | Shen et al. | | 375/267 |
| 7,440,437 B2* | 10/2008 | Song | | 370/343 |
| 7,444,144 B2* | 10/2008 | Demir et al. | | 455/422.1 |
| 7,529,311 B2* | 5/2009 | Shen et al. | | 375/267 |
| 7,635,573 B2* | 12/2009 | Fischer | | 435/23 |
| 7,792,500 B2* | 9/2010 | Luo et al. | | 455/101 |
| 7,818,013 B2* | 10/2010 | Li et al. | | 455/452.2 |
| 7,848,296 B2* | 12/2010 | Lee et al. | | 370/332 |
| 7,907,958 B2* | 3/2011 | Sampath et al. | | 455/509 |
| 7,920,511 B2* | 4/2011 | Khan et al. | | 370/328 |
| 7,969,964 B2* | 6/2011 | Kim et al. | | 370/350 |
| 8,045,512 B2* | 10/2011 | Khandekar et al. | | 370/329 |
| 8,054,823 B2* | 11/2011 | Dabak et al. | | 370/350 |
| 8,130,849 B2* | 3/2012 | Lincoln et al. | | 375/260 |
| 8,150,330 B2* | 4/2012 | Zhang et al. | | 455/69 |
| 8,213,943 B2* | 7/2012 | Malladi et al. | | 455/450 |
| 8,238,954 B2* | 8/2012 | Liu et al. | | 455/501 |
| 8,265,566 B2* | 9/2012 | Golitschek | | 455/67.7 |
| 8,279,962 B2* | 10/2012 | Moon et al. | | 375/267 |
| 8,295,225 B2* | 10/2012 | Ji et al. | | 370/318 |
| 8,340,122 B2* | 12/2012 | Lee et al. | | 370/464 |
| 8,351,950 B2* | 1/2013 | Wan et al. | | 455/450 |
| 8,396,153 B1* | 3/2013 | Shen et al. | | 375/267 |
| 8,406,218 B2* | 3/2013 | Kim et al. | | 370/350 |
| 8,406,754 B2* | 3/2013 | Chae et al. | | 455/422.1 |
| 8,417,252 B2* | 4/2013 | Palanki et al. | | 455/450 |
| 8,432,821 B2* | 4/2013 | Gorokhov et al. | | 370/252 |
| 8,433,258 B2* | 4/2013 | Luo et al. | | 455/101 |
| 8,442,572 B2* | 5/2013 | Borran et al. | | 455/522 |
| 8,462,711 B2* | 6/2013 | Ishii et al. | | 370/329 |
| 8,467,728 B2* | 6/2013 | Kim et al. | | 455/45 |
| 8,477,592 B2* | 7/2013 | Sutivong et al. | | 370/208 |
| 8,483,165 B2* | 7/2013 | Han et al. | | 370/329 |
| 8,498,639 B2* | 7/2013 | Chen et al. | | 455/434 |
| 8,531,962 B2* | 9/2013 | Chen et al. | | 370/236 |
| 8,606,287 B2* | 12/2013 | Landau et al. | | 455/452.1 |
| 8,666,426 B2* | 3/2014 | Ko et al. | | 455/452.2 |
| 8,792,436 B2* | 7/2014 | Lee et al. | | 370/329 |
| 8,811,331 B2* | 8/2014 | Koorapaty et al. | | 370/330 |
| 2007/0280175 A1* | 12/2007 | Cheng et al. | | 370/338 |
| 2008/0267138 A1* | 10/2008 | Walton et al. | | 370/336 |
| 2008/0293424 A1* | 11/2008 | Cho et al. | | 455/450 |
| 2009/0268685 A1* | 10/2009 | Chen et al. | | 370/329 |
| 2009/0285173 A1* | 11/2009 | Koorapaty et al. | | 370/330 |
| 2010/0103980 A1* | 4/2010 | Smith et al. | | 375/131 |
| 2010/0309801 A1* | 12/2010 | Jongren et al. | | 370/252 |
| 2011/0096735 A1* | 4/2011 | Damnjanovic et al. | | 370/329 |
| 2011/0274071 A1* | 11/2011 | Lee et al. | | 370/329 |
| 2011/0305195 A1* | 12/2011 | Forck et al. | | 370/328 |
| 2013/0012119 A1* | 1/2013 | Ma et al. | | 455/9 |

OTHER PUBLICATIONS

3GPP TS 36.212 V10.2.0, "3rd Generation Partnership Project; Technical Specification Group Radio Access Network; Evolved Universal Terrestrial Radio Access (E-UTRA); Multiplexing and channel coding (Release 10)," Lte Advanced (2011).
International Search Report for Application No. PCT/KR2010/002528 mailed Dec. 10, 2010.

* cited by examiner

FIG. 4

CRC mask for PBCH (LTE)

| Number of transmit antenna ports at eNode-B | PBCH CRC mask <br> < $X_{ant,0}, X_{ant,1}, ... X_{ant,15}$ > |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

FIG. 5

CRC mask for PBCH

| Number of LTE Tx antenna ports | Number of LTE Advanced Tx antenna ports | PBCH CRC mask <$x_{mask,0}, x_{mask,1}, ..., x_{mask,15}$> |
|---|---|---|
| 1 | 2 | <0, 0, 0, 0, 0, 0, 0, 0, 0, 0, 0, 0, 0, 0, 0, 0> |
| 2 | 4 | <1, 1, 1, 1, 1, 1, 1, 1, 1, 1, 1, 1, 1, 1, 1, 1> |
| 4 | 8 | <0, 1, 0, 1, 0, 1, 0, 1, 0, 1, 0, 1, 0, 1, 0, 1> |
| 1 | 4 | <1, 0, 1, 0, 1, 0, 1, 0, 1, 0, 1, 0, 1, 0, 1, 0> |
| 1 | 8 | <1, 0, 0, 1, 0, 0, 1, 0, 0, 1, 0, 0, 1, 0, 0, 1> |
| 2 | 8 | <0, 0, 1, 0, 0, 1, 0, 0, 1, 0, 0, 1, 0, 0, 1, 0> |

COOPERATIVE COMMUNICATION METHOD IN CELLULAR WIRELESS COMMUNICATION SYSTEM AND TERMINAL FOR PERFORMING THE METHOD

RELATED APPLICATIONS

This application is a 35 U.S.C. §371 national stage filing of PCT Application No. PCT/KR2010/002528 filed on Apr. 22, 2010, which claims priority to, and the benefit of, Korean Patent Application No. 10-2009-0035844 filed on Apr. 24, 2009. The contents of which are hereby incorporated by reference.

TECHNICAL FIELD

The present invention relates to a cellular wireless communication technique, and more particularly, to a coordinated communication method for coordinated communication in a cellular wireless communication system and a terminal device for performing the same.

BACKGROUND ART

In a cellular wireless communication system, terminals located in a cell boundary are limited in increasing a data transmission rate due to large interference from other cells. Multi-cell coordinated communication, a technique for increasing a data transmission rate of terminals located in a cell boundary, is one of candidate techniques to be applied to a 3rd Generation Partnership Project (3GPP) Long Term Evolution (LTE)-Advanced system. The multi-cell coordinated communication for an Orthogonal Frequency-Division Multiple Access (OFDMA) downlink which is being discussed for the LTE-Advanced system can be divided into the following two fields:

Joint transmission (joint processing): a terminal receives data from a plurality of transmission points; and Coordinated scheduling: a terminal receives data from one transmission point. Scheduling, precoding or beam forming of a terminal is performed through coordination (or cooperation) of multiple cells.

In most cases, one cell usually has one transmission point.

In a conventional multi-cell coordinated transmission method, only a serving cell receives channel state information (CSI) transmitted from a terminal via the uplink, information necessary for cooperation is extracted from the CSI, and the extracted information is transmitted to a surrounding coordinating cell. However, if the serving cell and the coordinating cell belong to different base stations, there is a problem in that information exchange between the cells causes a transmission delay and a traffic increment of a backhaul network.

As a conventional multi-cell coordinated communication method, U.S. Pat. No. 7,428,268, entitled "Cooperative MIMO in multicell wireless networks", discloses a joint transmission operation under a structure in which the serving cell and the coordinating cell belong to different base stations. In U.S. Pat. No. 7,428,268, a method in which a base station of the serving cell and a base station of the coordinating cell perform joint transmission is described. However, as described above, if the serving cell and the coordinating cell belong to different base stations, there is still a problem in that the transmission delay and the traffic overhead of the backhaul network are caused at the time of information exchange between the cells.

DISCLOSURE

Technical Problem

The present invention is directed to a coordinated communication method in which a terminal wirelessly transmits CSI feedback to a serving cell and at least one coordinating cell, and the serving cell and the coordinating cell perform multi-point coordinated communication using the CSI feedback.

The present invention is also directed to a terminal which performs the coordinated communication.

The present invention is also directed to a method of transmitting antenna port information to an LTE terminal or an LTE-Advanced terminal so that backward compatibility can be supported in the LTE-Advanced system.

Technical Solution

One aspect of the present invention provides a coordinated communication method in a cellular wireless communication system including a serving cell and at least one coordinating cell, including: wirelessly transmitting, at a terminal, channel state information (CSI) feedback to the serving cell and the at least one coordinating cell; and performing, at the serving cell and the at least one coordinating cell, coordinated communication using the CSI feedback received from the terminal.

The wirelessly transmitting, at the terminal, channel state information (CSD feedback to the serving cell and the at least one coordinating cell may include: wirelessly receiving, at the serving cell, first CSI feedback from the terminal; and wirelessly receiving, at the at least one coordinating cell, second CSI feedback from the terminal.

The method may further include notifying, at the serving cell, the coordinating cell of information about the CSI feedback and downlink scheduling information of the terminal.

The method may further include notifying the terminal of a cell ID of a cell which is determined as a coordinating cell by the serving cell.

The method may further include determining, at the serving cell, a cell which acts as the coordinating cell based on a measurement result of a neighboring cell reported by the terminal, and notifying the terminal of a cell ID of the cell determined as the coordinating cell by the serving cell.

The method may further include notifying, at the serving cell, the terminal of antenna port information of the serving cell and antenna port information of a neighboring cell around the terminal.

The antenna port information may include the number of antenna ports and location information of a reference signal used for acquisition of the CSI in a time-frequency resource space per each antenna port.

The notifying the terminal of antenna port information of the serving cell and antenna port information of a neighboring cell around the terminal at the serving cell may include, notifying, at the serving cell, the terminal of the antenna port information through a radio resource control (RRC) message.

The information about the CSI feedback may include at least one of a location of an uplink resource used for the CSI feedback and a feedback transmission format necessary for demodulation, and the downlink scheduling information of the terminal includes a location of a downlink resource through which data is transmitted to the terminal.

The terminal may transmit the information about the CSI feedback and the downlink scheduling information of the terminal to the coordinating cell when there is interference between femto cells.

Another aspect of the present invention provides a terminal for performing coordinated communication in a cellular wireless communication system including a serving cell and at least one coordinating cell. The terminal wirelessly transmits channel state information (CSI) feedback to the serving cell and the at least one coordinating cell.

The terminal may wirelessly transmit first CSI feedback to the serving cell and wirelessly transmits second CSI feedback to the at least one coordinating cell.

The terminal may receive a cell ID of cells which are determined as a coordinating cell by the serving cell.

The terminal may receive antenna port information of a neighboring cell around the serving cell from the serving cell through a physical broadcast channel (PBCH) or a radio resource control (RRC) message.

Still another aspect of the present invention provides a method of transmitting antenna port information to an LTE terminal or an LTE-Advanced terminal. The number of antenna ports which support the LTE terminal is differently set compared with the number of antenna ports which support the LTE-Advanced terminal within the same cell, and the method of transmitting antenna port information to an LTE terminal or an LTE-Advanced terminal includes: notifying, at each cell, a terminal within the each cell of the antenna port information of each cell, the antenna port information of each cell being included in a physical broadcast channel (PBCH).

The PBCH may further include time and frequency generation pattern information of a reference signal for acquisition of corresponding channel state information in addition to the antenna port number information.

The number of antenna ports which support the LTE-Advanced terminal may be indicated in a reserved bit of the PBCH.

The antenna port number information among the antenna port information may be expressed using different mask patterns depending on the number of antenna ports among the antenna port information using a CRC bit of the PBCH.

The multi-cell coordinated communication method according to exemplary embodiments of the present invention is not limited to a typical cell. Hereinafter, a term "cell" is used for convenience, but a cell may include a macro cell, a pico cell, a femto cell, or a relay node. That is, the multi-cell coordinated communication method according to exemplary embodiments of the present invention can be applied to various forms such as coordinated transmission and reception between cells, coordinated transmission and reception between relay nodes, and coordinated transmission and reception between a cell and a relay node. Communication between cells is necessary for coordinated transmission and reception or coordinated communication according to the present invention. The communication between cells may use a backbone network connected to a network, a dedicated line which directly connects a cell with a cell, or wireless communication between cells. In the case of the wireless communication between cells, as a radio resource used for a communication, part of a frequency band used for communication between a cell and a terminal or a different frequency band separated from a frequency band used for communication between a cell and a terminal may be used.

Effective inter-cell communication is required to effectively realize the joint processing or the coordinated scheduling. Particularly, since the joint processing requires very fast inter-cell communication, it can be applied to a case in which cells are connected through a dedicated line. In the case of the coordinated scheduling, a backbone network (backhaul network) connected to a network may be used for communication between cells belonging to different base stations.

Advantageous Effects

Using a coordinated communication method and a terminal for performing the same according to exemplary embodiments of the present invention, it is possible to minimize information exchange between cells and thereby prevent a transmission delay and a traffic increment of a backhaul network even in the case in which the serving cell and the coordinating cell belong to different base stations.

DESCRIPTION OF DRAWINGS

FIG. 4 is a table illustrating a physical broadcast channel (PBCH) cyclic redundancy check (CRC) mask of the LTE.

FIG. 5 is a table illustrating an example of a PBCH CRC mask of the LTE-Advanced according to an exemplary embodiment of the present invention.

BEST MODEL

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

Figure 1:
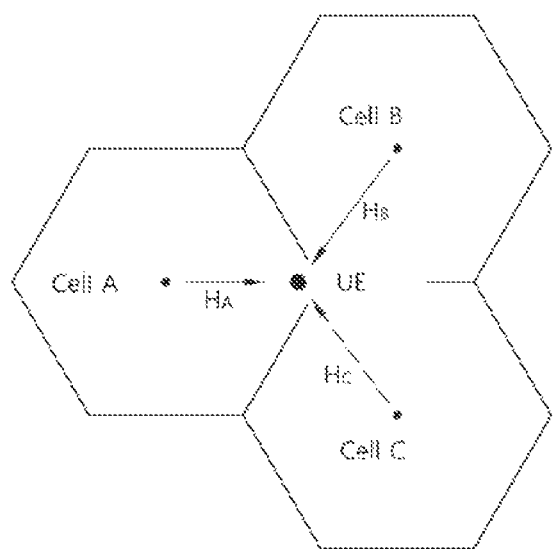
FIG. 1 is a conceptual diagram illustrating a case in which a terminal receives data from a plurality of cells including a serving cell through downlink joint transmission.
Figure 2:
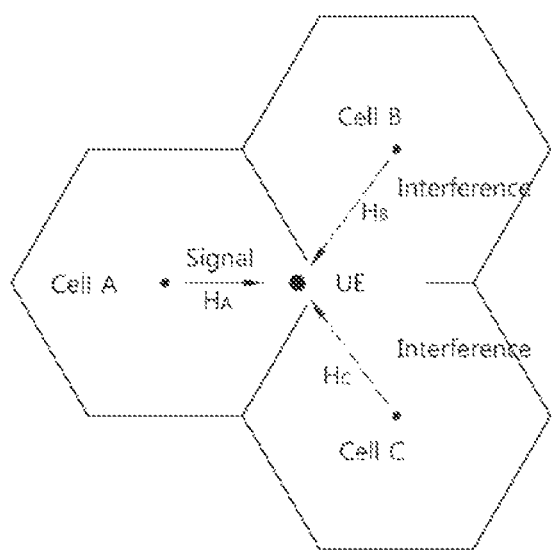
FIG. 2 is a conceptual diagram illustrating a case in which a terminal receives data from a plurality of cells including a serving cell through downlink coordinated scheduling.

FIG. 1 illustrates a case in which a terminal receives data from a plurality of cells including a serving cell through joint transmission. FIG. 2 illustrates a case in which a terminal receives data from a plurality of cells including a serving cell through coordinated scheduling. In FIGS. 1 and 2, it is assumed that a serving cell of a terminal is a cell A. In the case of FIG. 1, neighboring cells B and C transmit data to the terminal A together with the cell A. In the case of FIG. 2, the terminal A receives data only from the serving cell, the cell A, and signals transmitted from the cells B and C function as interference signals. In FIGS. 1 and 2, a cell may include a macro cell, a pico cell, or a femto cell, and may include a relay node.

The terminal needs to feedback downlink CSI to the neighboring cells as well as the serving cell to which it belongs for joint transmission or coordinated scheduling.

Typically, the terminal receives downlink control information from its serving cell, and the serving cell receives feedback transmitted via the uplink. In FIGS. 1 and 2, the terminal can transmit the CSI of the cells B and C under the assumption that the serving cell, the cell A, receives the CSI.

Figure 3:
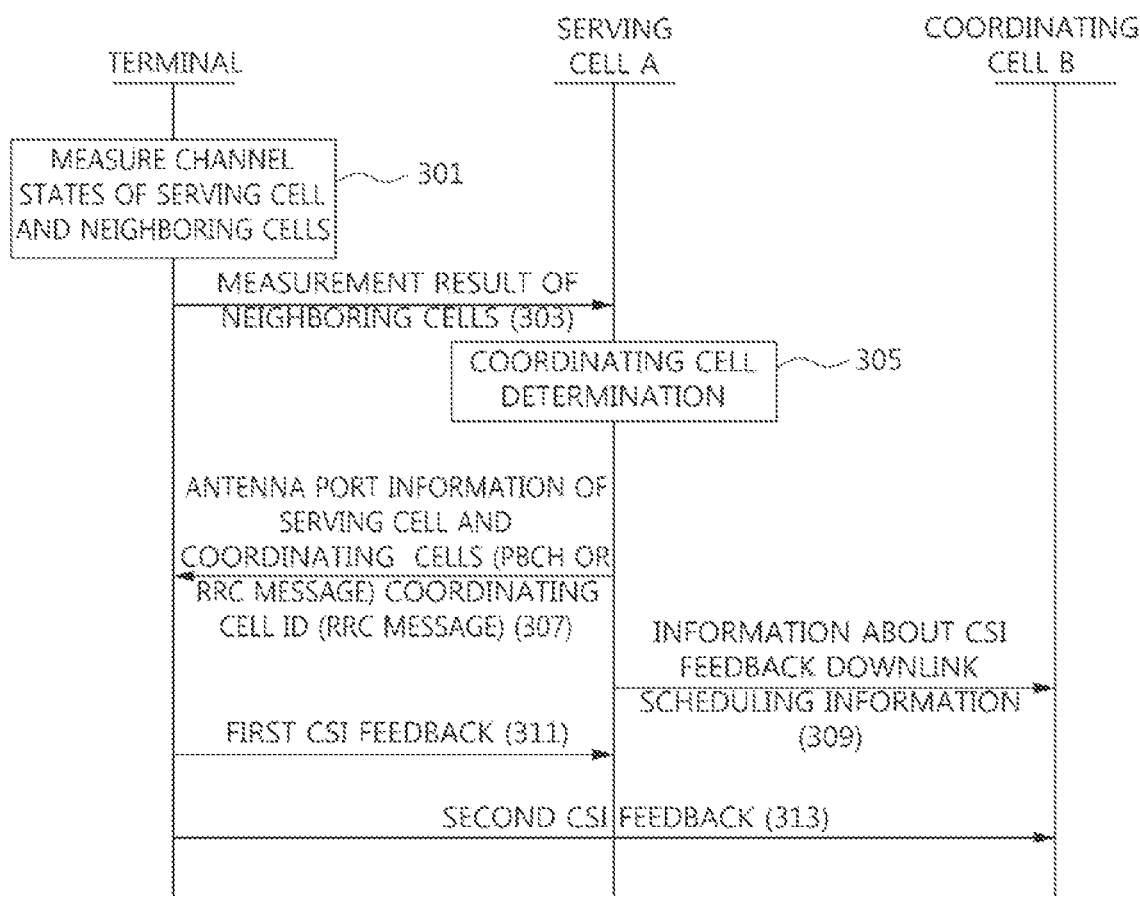
FIG. 3 is a message flowchart illustrating a coordinated communication method according to an exemplary embodiment of the present invention.

FIG. 3 is a message flowchart illustrating a coordinated communication method according to an exemplary embodiment of the present invention. The coordinated communication method according to an exemplary embodiment of the present invention is described below in connection with the coordinating cell B among a plurality of coordinating cells B and C in the case in which the cell A is the service cell in FIGS. 1 and 2.

Referring to FIG. 3, in order to enable the serving cell A to determine the coordinating cells, the terminal measures channel states of the serving cell A and neighboring cells (step 301) and transmit CSI to the serving cell A (step 303). For example, the terminal may measure the signal intensity of the neighboring cells of the terminal and report the signal intensity to the serving cell A.

The serving cell A determines the coordinating cell which will participate in multi-cell coordinated communication with reference to the measurement result of the neighboring cells which is reported from the terminal (step 305). For example, the serving cell A may determine the neighboring cells whose signal intensity is equal to or more than a predetermined level as coordinating cells with reference to the measurement result of the neighboring cells.

The serving cell A transmits information about the determined coordinating cells—for example, a cell ID of a cell constituting the coordinating cell—to the terminal (step 307). The serving cell A may notify the terminal of antenna port information of the serving cell A and antenna port information of the neighboring cells of the terminal. The antenna port information may include the number of antenna ports and location information of a reference signal used for acquisition of the CSI in a time-frequency resource space per each antenna port.

The serving cell may include the antenna port information in a radio resource control (RRC) message and transmit the antenna port information to the terminal. Each cell may transmit a physical broadcast channel (PBCH) including the antenna port information in order to notify the terminal within the cell of its antenna port information. The PBCH or the RRC message may further include time-frequency generation pattern information of the reference signal for acquisition of the CSI in addition to the antenna port number information.

The serving cell A notifies the coordinating cell A of information about the CSI feedback of the terminal which is a target of joint transmission and the downlink scheduling information of the terminal (step 309) so that the terminal can wirelessly transmit the CSI feedback to the serving cell A and the coordinating cell B, and the serving cell A and the coordinating cell B can cooperate to perform the coordinated communication using the CSI feedback received from the terminal.

The information about the CSI feedback may include a location of an uplink resource used for the CSI feedback of the terminal and a feedback transmission format necessary for demodulation. The feedback transmission format necessary for demodulation may include, for example, a size of a transport block, a modulation order, and scrambling information.

The downlink scheduling information of the terminal may include a location of a downlink resource through which data is transmitted to the terminal. The downlink scheduling information of the terminal may include information about a transmission format in the case of joint processing multi-cell coordinated communication. The information about the transmission format may include, for example, a size of a transport block, a modulation order, and scrambling information. Step 301 is performed by the terminal before or after receiving information about the determined coordinating cell or may be performed before the serving cell A notifies the terminal of the antenna port information of the serving cell A and the antenna port information of the neighboring cells around the terminal. The terminal wirelessly transmits first CSI feedback to the serving cell A (step 311), and second CSI feedback to the determined coordinating cell B (step 313).

As described above, the terminal wirelessly transmits the CSI feedback to the serving cell and one or more coordinating cells, and the serving cell and the one or more coordinating cells perform the coordinated communication using the CSI feedback received from the terminal.

MODE FOR INVENTION

In the conventional multi-cell coordinated transmission method, only the serving cell receives the CSI transmitted from the terminal through an uplink, information necessary for cooperation is extracted from the CSI, and the extracted information is transmitted to the coordinating cells around the terminal. However, in the case in which the serving cell and the coordinating cell belong to different base stations, there is a problem in that the information exchange between the cells causes a transmission delay and a traffic increment of a backhaul network.

One solution for resolving this problem is to enable the cells which participate in cooperation as well as the serving cell to receive the CSI transmitted from the terminal via the uplink. To this end, the cells which participate in cooperation can receive the following information as described above in FIG. 3.

(1) Information about the CSI Feedback of the Terminal
   A location of an uplink resource used for feedback
   A feedback transmission format necessary for demodulation (that is, a size of a transport block, a modulation order, and scrambling information)

(2) Downlink Scheduling Information of the Terminal
   A location of a downlink resource through which data is transmitted to the terminal
   A transmission format in the case of the joint processing multi-cell coordinated communication (that is, a size of a transport block, a modulation order, and scrambling information)

To this end, the serving cell notifies the coordinating cells of (1) the information about the CSI feedback of the terminal and (2) the downlink scheduling information of the terminal as described above in FIG. 3. In FIGS. 1 and 2, for example, the serving cell A may transmit the information for the uplink feedback transmission and the downlink scheduling information about the terminal as a cooperation target to the neighboring cells B and C.

If the coordinating cells are located in different base stations and communication is performed between the cells via the backhaul network since they are not connected through a dedicated line, it is desirable to generate a small amount of information at a low temporal frequency in order to prevent problems such as the transmission delay and traffic increment. Thus, it is desirable that the scheduling information not be frequently temporally changed. From this point of view, semi persistent scheduling (SPS) of the LTE release 8 standard is a good scheduling method to which the above-mentioned method can be applied. In the SPS of the LTE, if scheduling information such as a radio resource and a modulation coding scheme (MCS) which is allocated to the terminal is first relayed via a physical downlink control channel (PDCCH), the same scheduling information is kept in subsequent transmission without the PDCCH. Only the first transmission of each packet can be kept without the PDCCH, and in the case of the retransmission, the downlink SPS should be allocated via the PDCCH. The SPS can be applied when a constant amount of traffic is generated at a constant time interval, as in Voice over IP (VoIP).

The coordinating cells acquire the CSI directly from the terminal and participate in the coordinated transmission based on the CSI.

In the case of the joint processing multi-cell coordinated communication, the coordinating cells can apply the precoding to a transmitting antenna belonging to its cell using the CSI included in the feedback information of the terminal.

In the case of the coordinated scheduling multi-cell coordinated communication, the coordinating cells can select the precoding which interfere less with the terminal of the neighboring cell using the CSI included in the feedback information of the terminal when selecting the precoding applied to the terminal belonging to its cell.

Next, a method in which the terminal acquires information necessary for generating the CSI of the serving cell and the neighboring cells is described in detail.

According to the 3GPP LTE release 8 standard, the terminal can acquire time and frequency synchronization with the neighboring cells through a neighboring cell search. The terminal may receive and measure a reference signal of the neighboring cell and report the measurement result to the serving cell. According to the 3GPP technical specification (TS) 36.214, the measurement performed by the terminal with respect to the neighboring cell is carried out for an antenna port number 0 or antenna port numbers 0 and 1.

The base station which manages the serving cell may determine cells which will participate in the multi-cell cooperation with reference to the measurement result of the neighboring cells which is reported by the terminal, and the base station which manages the serving cell may notify the terminal of cells which are objects for which the terminal generates the CSI feedback information.

The terminal should be able to measure the CSI of a certain neighboring cell as well as the serving cell for the multi-cell coordinated transmission. For example, in the case of the coordinated scheduling multi-cell coordinated communication, terminal feedback information about the neighboring cell having the following form may be provided.

Precoding index or indices which give small interference to the terminal

Precoding index or indices which give large interference to the terminal

Channel matrix formed by the neighboring cell and the terminal: when the number of receiving antennas of the terminal is $N_R$ and the number of transmitting antennas of the cell is $N_T$, if a channel matrix of a k-th sub-carrier which is obtained by the terminal through channel estimation is $H_k$, it can be expressed as a matrix of Equation 1 having an size of $N_R \times N_T$.

$$H_k = \begin{bmatrix} H_{k,11} & \cdots & H_{k,1N_T} \\ H_{k,21} & \cdots & H_{k,2N_T} \\ \vdots & & \vdots \\ H_{k,N_R1} & \cdots & H_{k,N_RN_T} \end{bmatrix}$$ [Equation 1]

A channel covariance matrix computed from the channel matrix formed by the neighboring cell and the terminal: a channel covariance matrix $\Omega_k$ of the k-th sub-carrier can be computed by Equation 2 as follows.

$$\Omega_k = H_k^H H_k$$ [Equation 2]

A channel specific matrix computed from the channel matrix formed by the neighboring cell and the terminal and an eigenvalue: a non-zero eigenvalue and eigen vector elements which are obtained by singular value decomposition (SVD) of Ch.

In the case of the joint processing multi-cell coordinated communication, considering the transmitting antenna, it is necessary to compute the desired precoding indices of all transmitting antennas possessed by the cells which participate in the cooperation or feedback the channel matrix, the channel covariance matrix, and the channel specific matrix.

Therefore, for the sake of the above-mentioned feedback, the terminal should know the number of antenna ports of the neighboring cell around the terminal as well as the serving cell and a location of s reference signal (a CSI reference signal) of each antenna port for acquisition of the CSI in the time-frequency resource space. Such information is referred to as antenna port information. If the CSI reference signal is known from the antenna port information, it is possible to receive the reference signal and generate the CSI. The terminal can acquire the antenna port information of the serving cell and the neighboring cell by the following methods.

[Method 1] The terminal can acquire the antenna port information of the corresponding cell by demodulation of the PBCH.

To this end, the PBCH has to include information necessary for constituting the antenna port information. According to the LTE release 8 standard TS 36.212, cyclic redundancy check (CRC) bits of the PBCH are supposed to use different mask patterns depending on the number of antenna ports. Therefore, the terminal can recognize the number of antenna ports by checking the CRC bits.

FIG. 4 is a table illustrating a PBCH CRC mask in the 3GPP LTE. In the case of the 3GPP LTE, referring to TS 36.212 Section 5.3.1.1, as illustrated in FIG. 4, the 16-bit CRC of the PBCH may be masked depending on the antenna port information.

The followings need to be considered in connection with the antenna port used in the LTE and the LTE-Advanced system.

In the LTE-Advanced system, a maximum of 8 antenna ports, but more than the number (1, 2, or 4) of antenna ports which can be used in the LTE, can be used.

In order to guarantee backward compatibility, the LTE-Advanced system should be able to support the LTE terminal.

For these reasons, in the LTE-Advanced system, it should be possible to differently set the number of antenna ports which support the LTE terminal and the number of antenna ports which support the LTE-Advanced within the same cell.

In order for the terminal to generate the feedback information for the multi-cell coordinated transmission, it is necessary to know the number of antenna ports which support the LTE-Advanced.

The PBCH defined in the LTE release 8 standard can constitute information using a total of 24 bits, 10 bits of which are reserved bits which are not used in the release 8 for a future use. If the number of LTE-Advanced antenna ports is indicated using some of the reserved bits, the terminal can recognize a location of the CSI reference signal of each antenna port based on the number of LTE-Advanced antenna ports and the cell ID.

Figure 6:
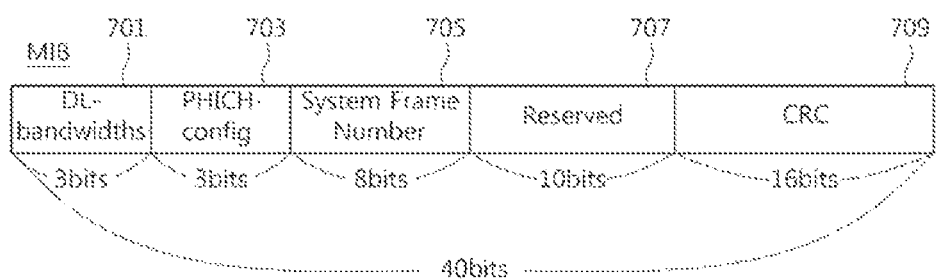
FIG. 6 illustrates an example of a master information block (MIB) data format of a PBCH according to an exemplary embodiment of the present invention.

FIG. 6 illustrates an example of a master information block (MIB) data format of the PBCH according to an exemplary embodiment of the present invention. Referring to FIG. 6, the MIB includes a "DL-bandwidths" field 701, a "PHICH-Config" field 703, a "System Frame Number" field 705, and "reserved bits" 707. The size of the transport block of the MIB is 24 bits. As illustrated in FIG. 6, the number of antenna ports which support the LTE-Advanced terminal is indicated using the reserved bits 707, 16 bits of "CRC bits" 709 are added to the MIB to constitute a total of 40 bits of the MIB. The CRC bits of the PBCH are supposed to use different mask patterns depending on the number of antenna ports. Therefore, the terminal can recognize the number of antenna ports by checking the added CRC bits.

The number of antenna ports for LTE-Advanced and a time and frequency generation pattern of the CSI reference signal can be additionally included in the PBCH. In this case, a plurality of patterns which give a two-dimensional location of the time and frequency of the reference signal can be defined, and corresponding patterns according to values of bits included in the PBCH can be previously defined in the standard.

Similarly to the method used in the LTE release 8, information about the antenna port for the LTE-Advanced can be included in the mask applied to the CRC. FIG. 5 is a table illustrating an example of a PBCH CRC mask in the LTE-Advanced according to an exemplary embodiment of the present invention. In this case, it is necessary to define different mask patterns depending on the number of antenna ports for LTE and the number of antenna ports for LTE-Advanced. As illustrated in FIG. 5, in order to guarantee the backward compatibility, the existing PBCH CRC mask patterns defined in the LTE release 8 should be included, and additional PBCH CRC mask patterns can be defined and used to express the antenna port information for the LTE-Advanced.

As described above, if information about the number of the LTE-Advanced antenna ports is added to the PBCH, there is an advantage that the terminal can easily acquire the antenna port information of the serving cell and the neighboring cell.

[Method 2] The base station which manages the serving cell determines cells which will participate in the multi-cell cooperation with reference to the measurement result of the neighboring cell reported by the terminal, and the base station notifies the terminal of cells which are objects for which the terminal generates the feedback information. At this time, the antenna port information of the cells which are targets of the feedback is relayed together. In this method, differently from [Method 1], the terminal receives a message transmitted from the serving cell and acquires the antenna port information of the neighboring cell even without opening the PBCH.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A coordinated communication method of a terminal in a cellular wireless communication system including a serving cell and at least one coordinating cell, comprising:
   measuring, by the terminal, channel states of the serving cell and neighboring cells,
   wirelessly transmitting, at the terminal, channel state information (CSI) feedback to the serving cell and the at least one coordinating cell;
   receiving, at the terminal, data from the serving cell and the at least one coordinating cell through a coordinated communication performed by the serving cell and the at least one coordinating cell using the CSI feedback transmitted from the terminal; and
   receiving, at the terminal, at least one cell ID of at least one cell determined as the at least one coordinating cell by the serving cell based on the measured channel state of one of the neighboring cells reported by the terminal.

2. The coordinated communication method of claim 1, wherein wirelessly transmitting, at the terminal, channel state information (CSI) feedback to the serving cell and the at least one coordinating cell comprises:
   wirelessly transmitting, at the terminal, first CSI feedback to the serving cell; and
   wirelessly transmitting, at the terminal, second CSI feedback to the at least one coordinating cell.

3. The coordinated communication method of claim 1, further comprising:
   notifying, at the serving cell, the coordinating cell of information about the CSI feedback and downlink scheduling information of the terminal.

4. The coordinated communication method of claim 3, wherein the information about the CSI feedback includes at least one of a location of an uplink resource used for the CSI feedback and a feedback transmission format necessary for demodulation, and the downlink scheduling information of the terminal includes a location of a downlink resource through which data is transmitted to the terminal.

5. The coordinated communication method of claim 3, wherein the terminal transmits the information about the CSI feedback and the downlink scheduling information of the terminal to the coordinating cell when there is interference between femto cells.

6. The coordinated communication method of claim 1, further comprising:
   receiving, at the terminal, antenna port information of the serving cell and antenna port information of a neighboring cell around the terminal.

7. The coordinated communication method of claim 6, wherein the antenna port information includes the number of antenna ports and location information of a reference signal used for acquisition of the CSI in a time-frequency resource space per each antenna port.

8. The coordinated communication method of claim 6, wherein the receiving antenna port information of the serving cell and antenna port information of a neighboring cell around the terminal comprises, receiving, at the terminal, the antenna port information through a radio resource control (RRC) message.

9. A terminal for performing coordinated communication in a cellular wireless communication system including a serving cell and at least one coordinating cell,
   wherein the terminal measures channel states of the serving cell and neighboring cells, wirelessly transmits channel state information (CSI) feedback to the serving cell and the at least one coordinating cell, and receives at least one cell ID of at least one cell which is determined as at least one coordinating cell by the serving cell based on the measured channel state of one of the neighboring cells.

10. The terminal of claim 9, wherein the terminal wirelessly transmits first CSI feedback to the serving cell and wirelessly transmits second CSI feedback to the at least one coordinating cell.

11. The terminal of claim 10, wherein the terminal receives antenna port information of a neighboring cell around the serving cell from the serving cell through a physical broadcast channel (PBCH) or a radio resource control (RRC) message.

* * * * *